US010921208B2

(12) United States Patent
Youssef et al.

(10) Patent No.: US 10,921,208 B2
(45) Date of Patent: Feb. 16, 2021

(54) SYSTEMS AND METHODS DIFFERENTIAL PRESSURE SENSING

(71) Applicant: InvenSense, Inc., San Jose, CA (US)

(72) Inventors: Joe Youssef, Santa Clara, CA (US);
Hemabh Shekhar, San Jose, CA (US);
Karthik Katingari, Milpitas, CA (US);
William Kerry Keal, Santa Clara, CA (US); Mubbasher Mukhtar, Calgary (CA)

(73) Assignee: InvenSense, Inc., San Jose, CA (US)

( * ) Notice: Subject to any disclaimer, the term of this patent is extended or adjusted under 35 U.S.C. 154(b) by 349 days.

(21) Appl. No.: 15/832,456

(22) Filed: Dec. 5, 2017

(65) Prior Publication Data
US 2018/0094998 A1 Apr. 5, 2018

Related U.S. Application Data

(63) Continuation-in-part of application No. 15/418,603, filed on Jan. 27, 2017, now abandoned, and a continuation-in-part of application No. 14/498,896, filed on Sep. 26, 2014, now Pat. No. 9,588,006.

(60) Provisional application No. 62/430,098, filed on Dec. 5, 2016.

(51) Int. Cl.
*G01L 27/00* (2006.01)
*G01P 3/62* (2006.01)
*G01P 13/02* (2006.01)
*G01L 13/06* (2006.01)
*G01C 5/06* (2006.01)

(52) U.S. Cl.
CPC .............. *G01L 27/005* (2013.01); *G01C 5/06* (2013.01); *G01L 13/06* (2013.01); *G01P 3/62* (2013.01); *G01P 13/02* (2013.01)

(58) Field of Classification Search
CPC ............ G01L 27/005; G01C 5/06; G01P 3/62
See application file for complete search history.

(56) References Cited

U.S. PATENT DOCUMENTS

2015/0133145 A1* 5/2015 Palanki ................. H04W 4/025
455/456.1
2015/0247917 A1* 9/2015 Gum ..................... H04W 4/029
342/452

* cited by examiner

*Primary Examiner* — Paul M. West
(74) *Attorney, Agent, or Firm* — Bay Area Technology Law Group PC

(57) ABSTRACT

A pressure sensor of a mobile device may be corrected by receiving reference pressure information from an associated device. The correction using differential pressure measurements may be influenced by one or more determined condition characteristics.

18 Claims, 13 Drawing Sheets

SYSTEMS AND METHODS DIFFERENTIAL PRESSURE SENSING

CROSS REFERENCE TO RELATED APPLICATIONS

Related Applications

This application claims priority from and benefit of U.S. Provisional Patent Application Ser. No. 62/430,098, filed Dec. 5, 2016, which is entitled "DIFFERENTIAL PRESSURE SENSOR," and is a continuation-in-part of U.S. patent application Ser. No. 14/498,896, filed Sep. 26, 2014, which is entitled "SYSTEMS AND METHODS FOR PRESSURE SENSOR CALIBRATION," and of U.S. patent application Ser. No. 15/418,603, filed Jan. 27, 2017, which is entitled "SYSTEMS AND METHODS FOR DIFFERENTIAL PRESSURE SENSING," all of which are assigned to the assignee hereof and are incorporated by reference in their entirety.

FIELD OF THE PRESENT DISCLOSURE

This disclosure generally relates to the correction of sensors and more specifically to the correction of a pressure sensor in a mobile device, including differential pressure sensor correction using multiple devices.

BACKGROUND

The development of microelectromechanical systems (MEMS) has enabled the incorporation of a wide variety of sensors into mobile devices, such as cell phones, laptops, tablets, gaming devices and other portable, electronic devices. Notably, information from pressure sensors may be used in a wide variety of applications including sports, fitness, navigation and others. Pressure sensors may be used to measure relative or absolute altitude through the analysis of changes in the atmospheric pressure and may be particularly useful when combined with information from other sensors. For example, motion sensors such as accelerometers or gyroscopes measure linear force or angular velocity along one or more orthogonal axes. A sensor fusion algorithm then may be used to combine data from these sources with the altitude information provided by the pressure sensor. As desired, data from additional sensors may also be combined, such as heading information derived from a magnetometer. Pressure sensor data may also be used in other applications, such as weather forecasting, environmental monitoring and others. However, as with other sensors, the value of information from a pressure sensor is directly related to its accuracy.

Accordingly, it would be desirable to provide systems and methods for correcting a pressure sensor in a mobile device. Further, when corrected pressure sensor data is available for a mobile device, it would also be desirable to facilitate the correction of pressure sensors in other devices. Still further, it would be desirable to share information between multiple devices to improve correction for one or more of the devices. As described in the following materials, this disclosure satisfies these and other goals to allow for more accurate sensing of pressure, such as for estimating altitude.

SUMMARY

As will be described in detail below, this disclosure includes a method for determining motion of a mobile device. The method may include obtaining sensor data from the mobile device comprising at least pressure sensor data, obtaining sensor data from at least one additional device comprising at least pressure sensor data, wherein the pressure sensor data from the at least one additional device is used as reference pressure information and correcting pressure sensor data from the mobile device based at least in part on the reference pressure information, wherein a vertical motion of the mobile device is determined based at least in part on the corrected pressure sensor data.

This disclosure also relates to a system for determining a motion of a mobile device comprising a mobile device having a pressure sensor, at least one additional device having a pressure sensor providing reference pressure information and a correction module. The correction module may be configured to correct pressure sensor data from the mobile device based at least in part on the reference pressure information sensor data from the second mobile device and determine a vertical motion of the mobile device based at least in part on the corrected pressure sensor data.

Further, this disclosure relates to a sensor unit of a mobile device that includes a pressure sensor outputting pressure sensor data, an input for obtaining reference pressure information from at least one additional device and an integrated processor configured to receive the pressure sensor data from the pressure sensor, receive the reference pressure information and correct the pressure sensor data.

BRIEF DESCRIPTION OF THE DRAWINGS

FIG. 12 is a schematic representation of an architecture for providing flight control using input from a self-correcting pressure sensor according to an embodiment

DETAILED DESCRIPTION

Figure 1:
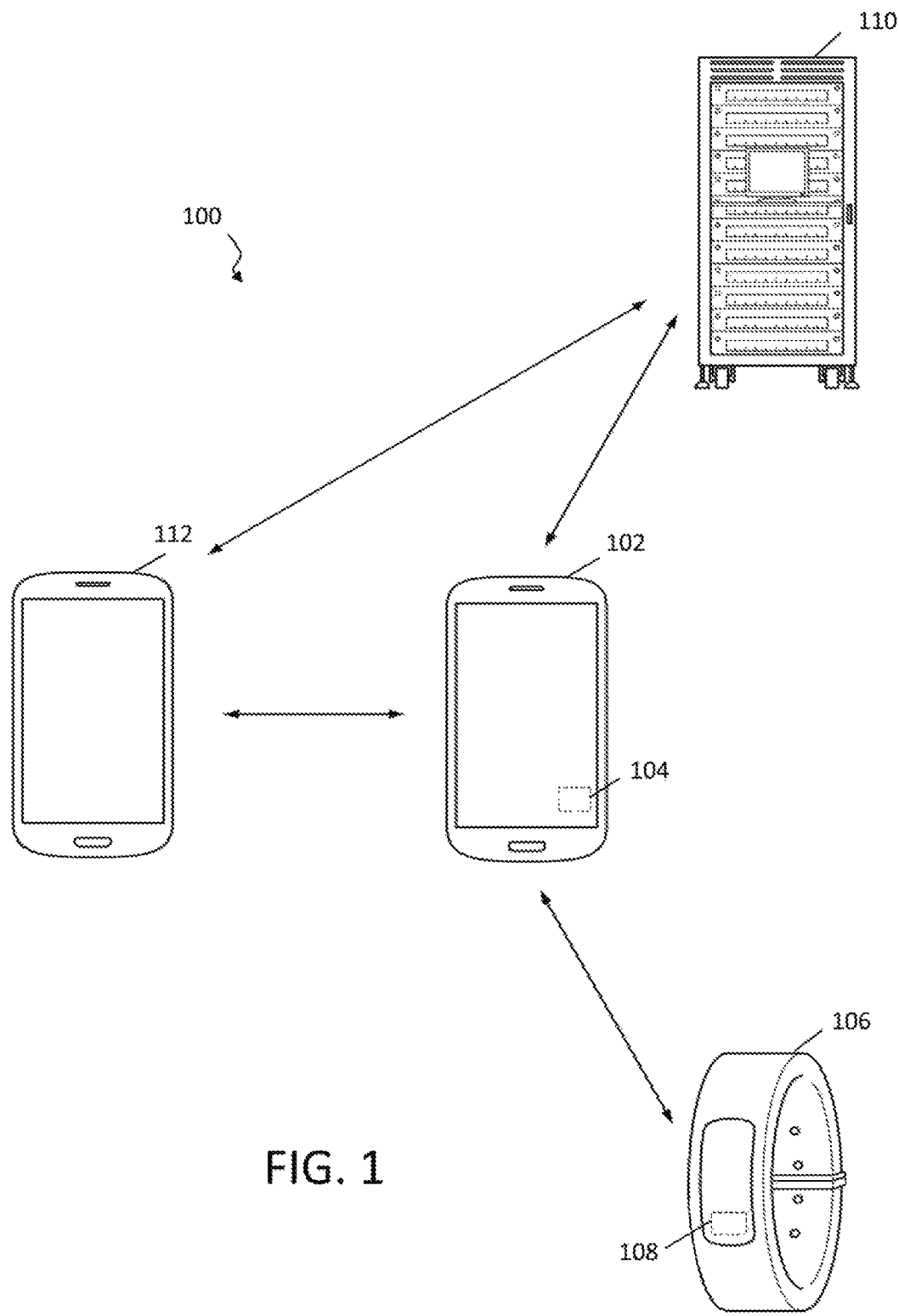
FIG. 1 is schematic diagram of a pressure sensor correction system according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, " "an" and "the" include plural referents unless the content clearly dictates otherwise.

According to this disclosure, a mobile device may have an integrated pressure sensor or may be associated with an auxiliary device having an integrated pressure sensor. According to the techniques of this disclosure, location information may be determined for the mobile device and used to obtain reference pressure information that is used to correct the pressure sensor. Additionally, when the pressure sensor of the mobile device has been corrected, output from the pressure sensor may be used as reference pressure information by another mobile device.

These and other aspects may be appreciated in the context of FIG. 1, which shows exemplary embodiments in the context of system 100. Mobile device 102 may include an integrated pressure sensor 104 and/or may be associated with auxiliary device 106 having a pressure sensor 108, communicating over a suitable protocol. As will be described below, sensor data and/or other information may be shared between mobile device 102 and auxiliary device 106 to facilitate correction of pressure sensor 104 and/or pressure sensor 108. The techniques of this disclosure involve correction of a pressure sensor based on differential pressure measurements, such as from pressure sensor 104 and pressure sensor 108. Generally, the reference pressure information may be obtained from auxiliary device 106, such that the reference pressure information may be expected to correlate with ambient pressure. Notably, the reference pressure information may be expected to reflect global changes in pressure that affect both auxiliary device 106 and mobile device 102. In some embodiments, both mobile device 102 and auxiliary device 106 may be mobile and subject to changes in elevation. As will be discussed in further detail below, the roles performed by mobile device 102 and auxiliary device 106 may be dynamically assigned or reassigned in such embodiments, so that any one device may be used to provide reference pressure information to another device. In other embodiments, auxiliary device 106 may be temporarily or permanently fixed in position, such that it may be assumed to be the source of reference pressure information.

In one embodiment, mobile device 102 and auxiliary device 106 may be a smart phone and a wearable, such as a watch, fitness band, or the like. Mobile device 102 and auxiliary device 106 may communicate using a personal area network (PAN), such as a protocol employing wireless communication, such as BLUETOOTH®, ZigBee®, ANT, near field communication (NFC), infrared (IR) or other technology adapted for relatively short-range, power efficient wireless communication. Similarly, a Wireless Local Area Network (WLAN), such as one conforming to Institute for Electrical and Electronic Engineers (IEEE) 802.11 protocols, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may also be used. Still further, in some applications, a suitable wired connection protocol may be employed as desired. Although mobile device 102 and auxiliary device 106 may be associated simply by being in communication together, in some embodiments the device may be coordinated in a joint application. Specific examples include those in which mobile device 102 is configured as a drone or other vehicle and auxiliary device 106 functions as a remote controller. As another illustration, mobile device 102 may be a head mounted display (HMD) and auxiliary device 106 may be a suitable input device. The techniques of this disclosure are not limited to these embodiments and may be applied in many other contexts.

Mobile device 102 may have location awareness capabilities and may communicate information regarding its determined position to a source of external reference pressure information, as represented by server 110 or another mobile device 112. In some embodiments, device 102 may receive reference pressure information from the external source based on the determined position. Device 102 may then use the received reference pressure information to correct the pressure sensor. As will be appreciated, server 110 may have a database to correlate location with pressure information, such as may be maintained from weather stations, including National Oceanic and Atmospheric Administration (NOAA) or National Climatic Data Center (NCDC) stations, news stations, airports, or any other suitable source of meteorological information. Server 110 may, additionally or in the alternative, function to aggregate pressure information data in a "crowd-sourced" fashion from other mobile devices, such as device 112. When device 112 has an acceptably calibrated pressure sensor, it may upload pressure information measurements and corresponding location information to be used as reference pressure information to server 110. Subsequently, server 110 may then distribute reference pressure information to mobile device 102 depending upon its determined position. Pressure information includes atmospheric pressure data and may also include data associated with any number of related environmental conditions, such as temperature, humidity, and the like. In other embodiments, sensor data from one of pressure sensor 104 or pressure sensor 108, optionally in conjunction with other information, may be used as reference pressure information by the other sensor to provide differential pressure sensing.

Upon receipt of reference pressure information, device 102 may correct its pressure sensor 104 and/or pressure sensor 108 on auxiliary device 106 may be corrected, as warranted. In one aspect, device 102 may use reference pressure information corresponding to multiple adjacent locations by performing a suitable weighting operation to interpolate or extrapolate a suitable atmospheric pressure reference measurement for its determined position. In another aspect, device 102 may compensate the received reference pressure information using locally-sensed environmental conditions, such as temperature and/or humidity. Device 102 may receive pressure information used for correction from an individual source or any combination and number of external sources, including auxiliary device 106 as well as other sources exemplified by other device 112 and server 110. In one aspect, reference pressure information may be contemporaneous within a suitable margin. In another aspect, reference pressure information may correspond to a time period different from when device 102 corrects its pressure sensor. In another aspect, server 110 may use reference pressure information corresponding to multiple adjacent locations by performing a suitable weighting operation to interpolate or extrapolate a suitable atmospheric pressure reference measurement for the determined position of device 102. As warranted, device 102 may apply a compensation based on temperature and/or humidity, or other environmental condition characteristic as described in further detail below when employing non-contemporaneous reference pressure information.

Figure 2:
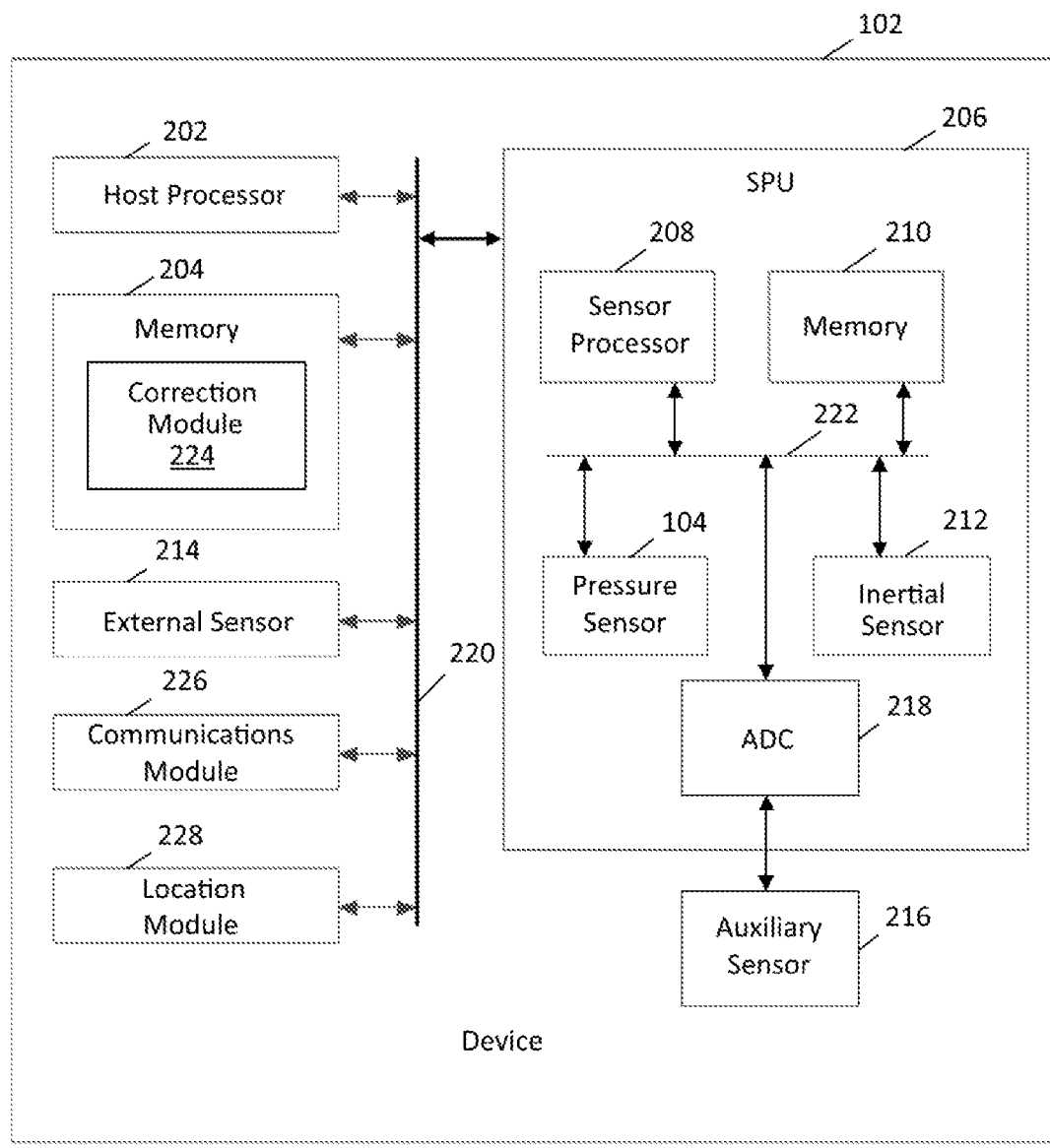
FIG. 2 is schematic diagram of a mobile device with a pressure sensor according to an embodiment.

Details regarding one embodiment of system including mobile electronic device 102 including features of this disclosure are depicted as high level schematic blocks in FIG. 2. As will be appreciated, device 102 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices. In some embodiments, mobile device 102 may be implemented as a head mounted display (HMD), either as a dedicated HMD or other augmented reality (AR)/virtual reality (VR) device, or may be another portable device having capabilities that may be leveraged to provide some degree of functionality associated with a HMD, including those noted above.

As shown, device 102 includes a host processor 202, which may be one or more microprocessors, central processing units (CPUs), or other processors to run software programs, which may be stored in memory 204, associated with the functions of device 200. Multiple layers of software can be provided in memory 204, which may be any combination of computer readable medium such as electronic memory or other storage medium such as hard disk, optical disk, etc., for use with the host processor 202. For example, an operating system layer can be provided for device 102 to control and manage system resources in real time, enable functions of application software and other layers, and interface application programs with other software and functions of device 102. Similarly, different software application programs such as menu navigation software, games, camera function control, navigation software, communications software, such as telephony or WLAN software, or any of a wide variety of other software and functional interfaces can be provided. In some embodiments, multiple different applications can be provided on a single device 102, and in some of those embodiments, multiple applications can run simultaneously. As one example, a motion algorithm layer can provide motion algorithms that provide lower-level processing for raw sensor data provided from the motion sensors and other sensors. A sensor device driver layer may provide a software interface to the hardware sensors of device 102. Further, a suitable application program interface (API) may be provided to facilitate communication between host processor 202 and SPU 206, for example, to transmit desired sensor processing tasks. Other embodiments may feature any desired division of processing between SPU 206 and host processor 202 as appropriate for the applications and/or hardware being employed. For example, lower level software layers may be provided in SPU 206 and an API layer implemented by host processor 202 may allow communication of the states of application programs as well as sensor commands.

Device 102 includes at least one sensor assembly, as shown here in the form of integrated sensor processing unit (SPU) 206 featuring sensor processor 208, memory 210 and pressure sensor 104. Memory 210 may store algorithms, routines or other instructions for processing data output by pressure sensor 104 and/or other sensors as described below using logic or controllers of sensor processor 208, as well as storing raw data and/or motion data output by pressure sensor 104 or other sensors. Memory 210 may also be used for any of the functions associated with memory 204. In addition to pressure sensor 104, inertial sensor 212 may be one or more sensors for measuring motion of device 102 in space, such as an accelerometer, a gyroscope, a magnetometer, or others. Depending on the configuration, SPU 206 measures one or more axes of rotation and/or one or more axes of acceleration of the device. In one embodiment, inertial sensor 212 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208, or other processing resources of device 102, combines data from inertial sensor 212 to provide a six axis determination of motion or six degrees of freedom (6DOF). As desired, inertial sensor 212 may be implemented using Micro Electro Mechanical System (MEMS) to be integrated with SPU 206 in a single package. Exemplary details regarding suitable configurations of host processor 202 and SPU 206 may be found in, commonly owned U.S. Pat. No. 8,250,921, issued Aug. 28, 2012, and U.S. Pat. No. 8,952, 832, issued Feb. 10, 2015, which are hereby incorporated by reference in their entirety. Suitable implementations for SPU 206 in device 102 are available from InvenSense, Inc. of Sunnyvale, Calif.

Alternatively or in addition, device 102 may implement a sensor assembly in the form of external sensor 214. This is optional and not required in all embodiments. External sensor may represent one or more sensors as described above, such as an accelerometer and/or a gyroscope. As used herein, "external" means a sensor that is not integrated with SPU 206 and may be remote or local to device 102. In this embodiment, external sensor 214 may output sensor data in a digital format. Also alternatively or in addition, SPU 206 may optionally receive data from an auxiliary sensor 216 configured to measure one or more aspects about the environment surrounding device 102. In this embodiment, auxiliary sensor 216 is configured as an analog device, and provides output to analog to digital converter (ADC) 218, which may be integrated with SPU 206 or may be a separate component.

In the embodiment shown, host processor 202, memory 204, SPU 206, external sensor 214 and other components of device 200 may be coupled through bus 220, while sensor processor 208, memory 210, pressure sensor 104, inertial sensor 212 and/or ADC 218 may be coupled though bus 222, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 102, such as by using a dedicated bus between host processor 202 and memory 204.

Algorithms, routines or other instructions for processing sensor data may be employed by correction module 224 to perform any of the operations associated with the techniques of this disclosure, such as receiving reference pressure information and correcting pressure sensor 104. Further, determining the motion or orientation of portable device 102. Although this embodiment is described in the context of pressure sensor 104, inertial sensor 212, external sensor 214 and auxiliary sensor 216, any suitable architecture may be employed to implement any combination of sensors, such as accelerometers, gyroscopes, magnetometers, pressure sensors, microphones, proximity, and ambient light sensors, and temperature sensors among others sensors, internal or externally and as digital or analog devices. Any combination of sensor information may be involved in sensor fusion or similar operations performed by SPU processor 208 to provide a four axis, a seven axis, a ten axis or other combination determination of motion by fusing the vertical axis estimated by information from pressure sensor 104 with 3-axis gyroscopes, accelerometers and/or magnetometers. In other embodiments, some, or all, of the processing and calculation may be performed by the host processor 202, which may be using the host memory 204, or any combination of other processing resources. In one aspect, implementing correction module 224 in SPU 206 may allow the operations described in this disclosure to be performed with reduced or no involvement of host processor 202. As will be appreciated, this may provide increased power efficiency and/or may free host processor 202 to perform any other task(s). However, the functionality described as being performed by correction module 224 may be implemented using host processor 202 and memory 204 as indicated in FIG. 2 or any other combination of hardware, firmware and software or other processing resources available in portable device 102.

Portable device 102 may also include communications module 226 to receive reference pressure information, such as from auxiliary device 106 as well as other suitable sources. Any suitable wireless or wired protocol may be used, including those noted above. Communications module 226 may also be employed to exchange information regarding one or more condition characteristics that influence the operations performed by correction module 224. As will be described in further detail below, a condition characteristic may affect the pressure being measured by pressure sensor 104 and/or pressure sensor 108, and thus be determined with respect to mobile device 102, auxiliary device 106 or both. Correction module 224 may also use communications module 226 to transmit information determined by pressure sensor 104 after it has been suitably calibrated, as well as information from any other sensors as desired, together with a determined position to server 110 or other device 112 for use as reference pressure information.

Further, device 102 may also feature location awareness capabilities, such as may be provided by location module 228. In general, location awareness refers to the use of any suitable technique to determine the geospatial position of device 102. One of skill in the art will appreciate that any number of technologies may be implemented as desired. Without limitation, examples of suitable location awareness methods include global navigation satellite systems (GNSS), such as global positioning system (GPS), global navigation satellite system (GLONASS), Galileo and Beidou, as well as WiFi™ positioning, cellular tower positioning, Bluetooth™ positioning beacons, dead reckoning or other similar methods. Location module 228 provides a determination of the position of device 200 with sufficient resolution to enable identification of relevant reference pressure information according to the techniques of this disclosure. As will be appreciated, this may include a determination of altitude in addition to latitude and longitude. In one aspect, location module 228 may determine the position of device 102 based on the proximity indicated by the communication module 226. For example, the communications protocol employed may be associated with a defined range such that the ability of device 102 to communicate with another device represents sufficient proximity to the other device, such as auxiliary device 106, to utilize its reference pressure information in a correction process.

As illustration only and without limitation, correction module 224 may be implemented as any suitable combination of hardware and software to process reference pressure information to perform one or more correction routines with respect to pressure sensor 104. As desired, correction module 224 may adjust, calibrate, compensate or otherwise alter measurements of pressure sensor 104 using reference pressure information from auxiliary device 106 as well as from other sources. Such reference pressure information may correspond to the position determined for device 102 by location module 228. For example, correction module 224 may determine offset values by subtracting a reference pressure and the pressure measured by pressure sensor 104. Other suitable parameters determined by correction module 224 may include sensitivity, linearity and/or coefficients associated with related environmental variables such as temperature or humidity. Correction module 224 may also use reference pressure information corresponding to multiple adjacent locations by performing a suitable weighting operation to interpolate or extrapolate a suitable atmospheric pressure reference measurement for its determined position. In another aspect, correction module 224 may compensate the received reference pressure information using locally-sensed environmental condition characteristics, such as temperature and/or humidity. Further, the reference pressure information may be contemporaneous within a suitable margin or may correspond to a different time period different. When employing non-contemporaneous reference pressure information, a compensation based on one or more environmental condition characteristics, such as temperature and/or humidity, may be applied. Aspects of correction module 224 may be implemented in software, which includes, but is not limited to, application software, firmware, resident software, microcode, etc., and may take the form of a computer program product accessible from a computer-usable or computer-readable medium providing program code for use by or in connection with a computer or any instruction execution system, such as host processor 202, sensor processor 208 or any other processing resources of device 102.

In a further aspect, correction module 224 may be configured to determine a condition characteristic for device 102 and adjust correction operations accordingly. In addition to the inertial or other motion sensors, pressure sensors may also be used to determine a height or elevation or a change in height or elevation. As used herein, the term determining altitude may involve either an absolute height estimation, a relative height estimation and/or an estimation of change in height. However, pressure sensors are also sensitive to other influences that change the barometric pressure and temperature. For example, in outside situations, the wind may influence the pressure sensor reading, while indoor locations may experience fluctuations in air pressure, e.g. due to air conditioning changes. Accordingly, aspects of techniques of this disclosure include determining one or more condition characteristics to be used when correcting pressure sensor information. In general, anything that may affect the pressure being measured is considered a condition characteristic and, once determined, may be used as warranted to improve the correction. For example, it may be expected that there will be greater changes in ambient pressure for indoor locations, so when an environmental condition characteristic indicates mobile device 102 is indoors, pressure sensor 104 may be corrected with the reference pressure information.

In this context, a condition characteristic is anything that may be predicted to perturb or alter the pressure sensor data. A given condition characteristic may apply to either or both mobile device 102 and auxiliary device 106. One class of condition characteristic may relate to usage. For example, if device 102 includes a transceiver, ongoing transmissions may cause an increase in temperature of the device. As another example, operation of device 102 may affect the local pressure directly, such as when device 102 is implemented as a drone, given that the pressure measured by pressure sensor 104 may be related to rotor speed. Another class of condition characteristic may relate to environmental aspects. For example, when device 102 is determined to be in a pocket or other enclosed location, this condition characteristic may be determined so that confidence in the validity of pressure measurements may be reduced. As another illustration, a light sensor may be used to distinguish between operation in sun versus shade, with the expectation that a difference in temperature may exist that affects the measurements of pressure sensor 104. Still further, a condition characteristic may be determined directly or indirectly from location module 228. In one embodiment, location manager 228 may determine a position with sufficient accuracy to allow correction module 224 to assume device 102 is in an indoor location or other position expected to impact measured pressure. As another example, location manager 228 may involve GNSS such that an analysis of the number and quality of received signals may allow a determination that device 102 is indoors rather than outdoors. In yet another aspect, inertial sensor 212 may be used to determine a condition characteristic of device 102. Correspondingly, depending upon the determined condition characteristic, correction module 224 may apply a compensation, defer correction to a more advantageous time or perform any other operation that may be warranted by the anticipated effect of the condition characteristic on pressure sensor 104.

Figure 3:
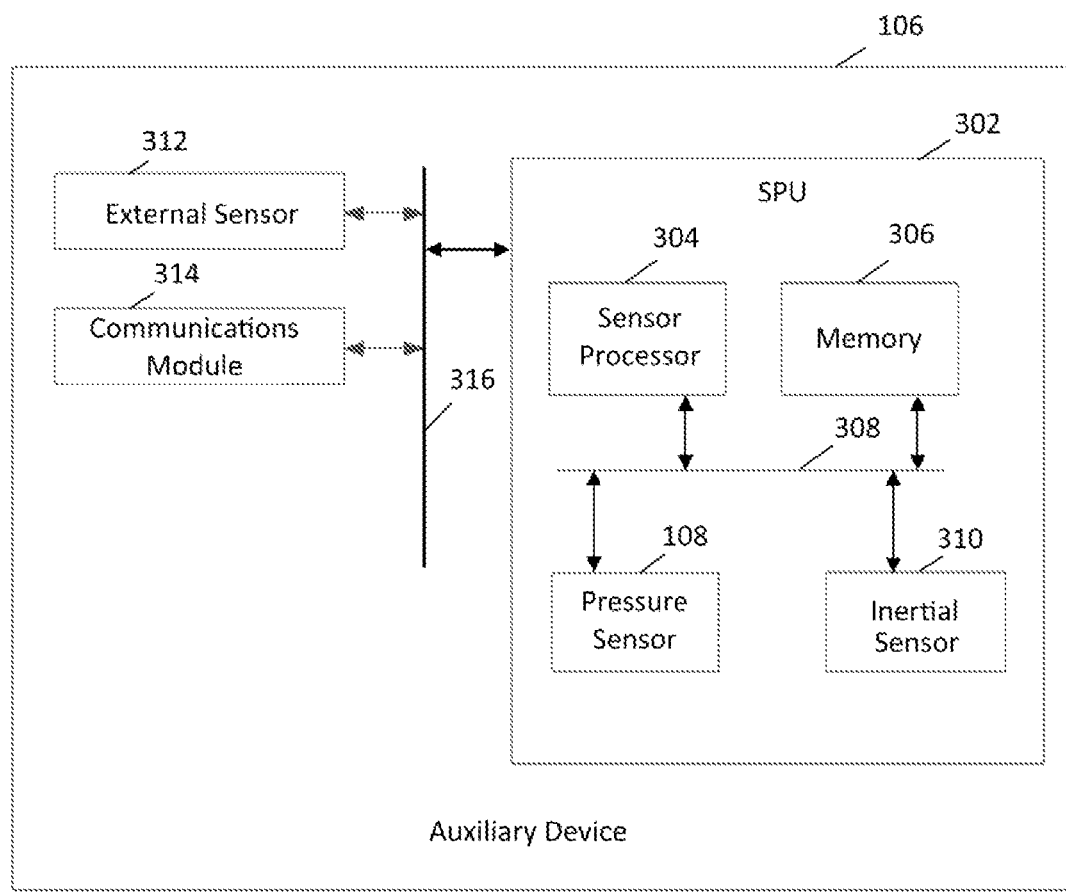
FIG. 3 is schematic diagram of a mobile device with an associated auxiliary device having a pressure sensor according to an embodiment.

As noted above, mobile device 102 may receive reference pressure information from associated auxiliary device 106. Depending on the embodiment, auxiliary device 106 may have functional components similar to those described above with respect to mobile device 102 as schematically depicted in FIG. 3. Auxiliary device 106 may be associated with mobile device 102 such as in the use cases of a wearable being employed together with a smart phone, a controller for piloting a drone, a base station and/or user input device controlling an HMD, or many other applications. In one aspect, auxiliary device 106 may be sufficiently proximate when associated with device 102 so that position determinations made by device 102 also correspond to auxiliary device 106. Accordingly, auxiliary device 106 may be within a range of approximately 10 m in one embodiment. In other embodiments, such as when mobile device 102 is configured as a drone or other vehicle, the range may be increased, but still sufficiently close to allow an assumption that conditions affecting the ambient pressure at the location of auxiliary device 106 relate to the conditions affecting the ambient pressure at the location of mobile device 102. As such, auxiliary device 106 may include SPU 302, having sensor processor 304, memory 306 and pressure sensor 108 coupled by bus 308. Auxiliary device 106 may have one or more additional sensors, such as motion sensor 310 or external sensor 312 as desired. In general, any of the sensor architectures discussed above with respect to mobile device 102 may be used. As such, the sensors of auxiliary device 106 may be one or more motion sensors, may be internal or external and may be analog or digital components. In this exemplary embodiment, SPU 302, communications module 314 and external sensor 312 may be coupled by bus 316, although any suitable architecture may be employed. A link between the communications modules of mobile device 102 and auxiliary device 106 may be used to transfer measurements of atmospheric pressure obtained by pressure sensor 108 as reference pressure information for correction of pressure sensor 104 by correction module 224 as described above. Additionally, pressure information obtained by pressure sensor 104 may be sent to auxiliary device 106 and/or information pertaining to one or more condition characteristics may be exchanged between mobile device 102 and auxiliary device 106. Such communications may employ any desired wired or wireless protocol as described above. Although FIGS. 2 and 3 depict correction module 224 as being implemented in device 102, any or all the functions of correction module 224 may be performed using corresponding processing and memory resources in auxiliary device 106, such as by sensor processor 304 and memory 306.

Figure 4:
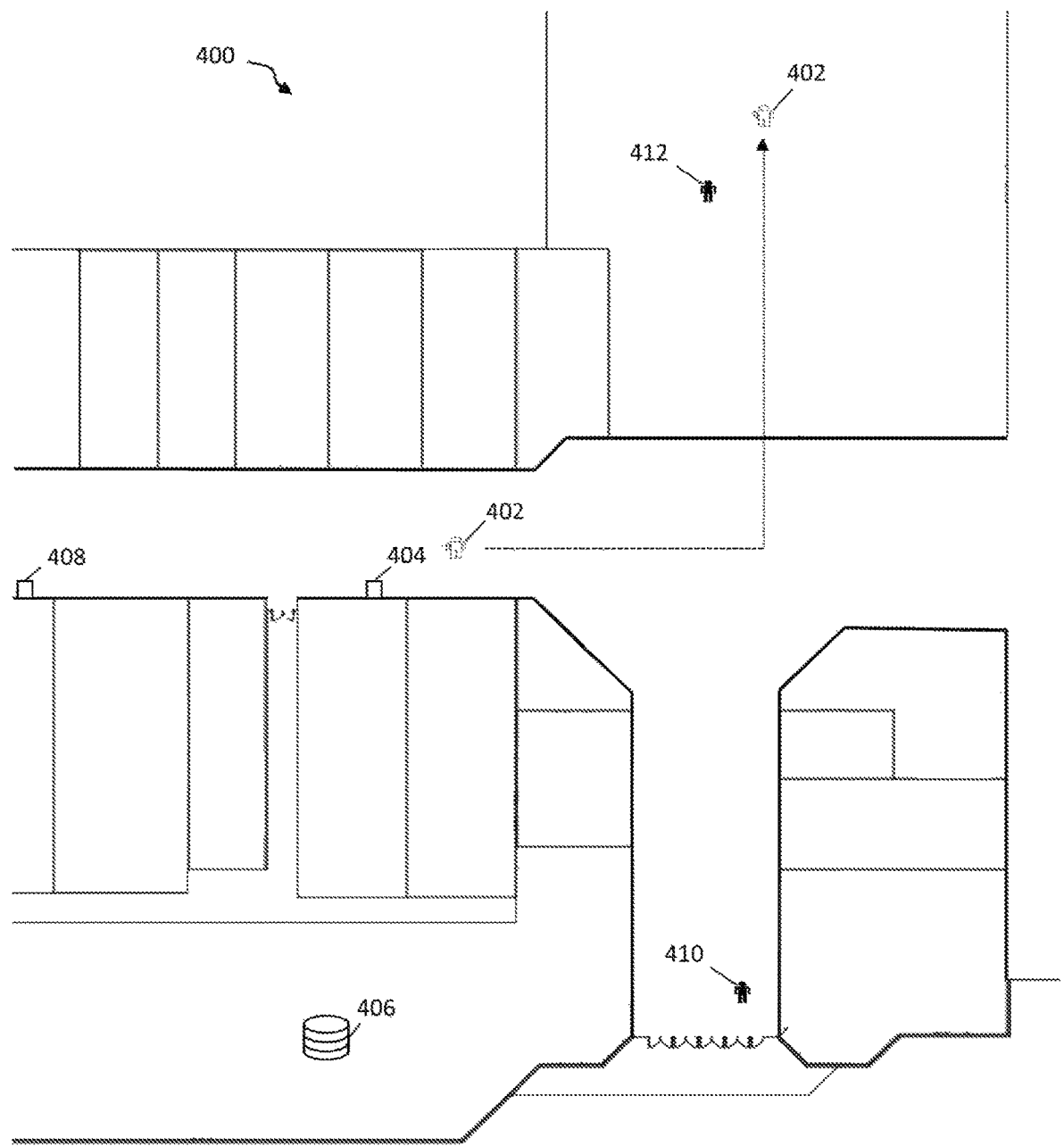
FIG. 4 is a schematic diagram showing exemplary conditions for correcting a pressure sensor associated with a mobile device according to an embodiment.

Examples of pressure sensor correction, such as may be performed by mobile device 102 and auxiliary device 106, are depicted with reference to a schematic map of an indoor shopping mall 400 is depicted in FIG. 4. User 402 may have a mobile device configured to correct a pressure sensor using external reference pressure information according to the techniques of this disclosure. In one aspect, user 402 may be within a suitable threshold distance of a fixed, external pressure sensor 404. Upon determination of proximity to external pressure sensor 104, the mobile device of user 402 may receive corresponding reference pressure information and perform a correction process. As described above, communication may occur directly between the mobile device of user 402 and the external sensor, or may be mediated through a remote server 406. Although depicted as being within shopping mall 400, the location of server 406 is not limited.

In another aspect, device 102 may not be sufficiently proximate to any one source of reference pressure information. Accordingly, the mobile device of user 402 may receive reference pressure information from multiple sources, such as external pressure sensor 408 and a mobile device associated with user 410. Any suitable number of sources may be employed. As noted above, the mobile device of user 402 may be configured to weight the reference pressure information received from multiple source based on criteria such as proximity or reliability when performing the correction operation.

In yet another aspect, user 402 may travel to a different location as indicated. When the pressure sensor of user 402's mobile device is considered to be sufficiently corrected, it may provide reference pressure information for use by another device. As shown, user 412 may have a mobile device that receives reference pressure information from the mobile device of user 402 to perform a correction operation. The reference pressure information may be communicated directly between devices or may be delivered over a network, such as by server 406.

Figure 5:
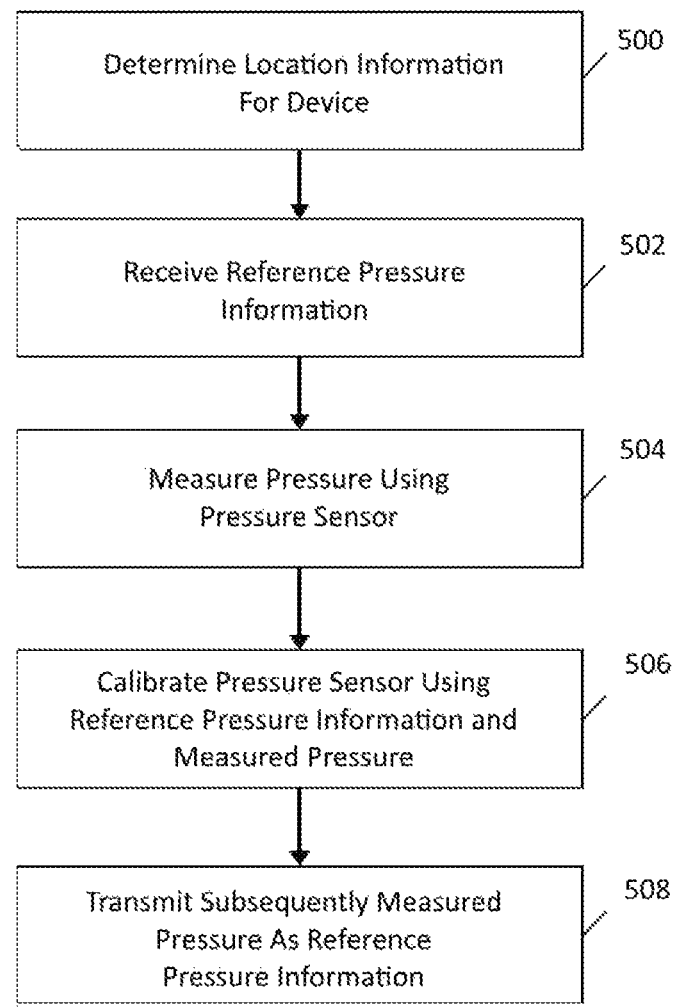
FIG. 5 is flowchart showing a routine for correcting a pressure sensor associated with a mobile device according to an embodiment.

To help illustrate aspects of this disclosure, FIG. 5 depicts a flowchart showing a process for correcting a pressure sensor associated with a mobile device. Beginning with 500, a position of device 102 may be determined, such as by using location module 228. In 502, reference pressure information may be received from auxiliary device 106, as well as any number of suitable external sources, including a server, another mobile device or a fixed sensor installation. Pressure may then be measured at device 102 using pressure sensor 104 in 504. Then, in 506, correction module 224 may correct pressure sensor 104 using the measured pressure and the reference pressure information. As desired, device 102 may transmit a subsequently measured pressure as reference pressure information, to be used in a correction process performed by a different device.

As discussed above, mobile devices may be equipped with different sensors in order to determine its position and orientation in space. For example, inertial sensors or motion sensors such as accelerometers, gyroscopes, and magnetometers may be used. The accelerometers may provide information about the orientation of the device with respect to gravity, and magnetometers may provide information about the orientation with respect to the earth's magnetic fields. Gyroscopes measure angular velocities and may be used to determine changes in orientation with respect to a known orientation, which may be based on the accelerometer and magnetometer data. Accelerometer data may be used through double integration to determine a position change of the mobile device. In addition to the motion sensors, pressure sensor may be used to determine elevation of the mobile device. Sensor data from different sensors may be combined in a sensor fusion process in order to determine the position and/or orientation of the mobile device in space.

For some mobile devices, a correct determination of the device's elevation may be important. For example, for drones the altitude may be determined using some of the above mentioned sensors, including pressure sensor 104 for example, and may be used for features such as automatic landing or takeoff, or hovering at a fixed height. For other devices such as an HMD or smartphone used in AR/VR applications, the height information may also be required in order to follow changes in (vertical) position in the virtual world. When the elevation is determined using a pressure sensor, any other factors changing the pressure except the height or elevation may influence the correct altitude determination. In other words, any change of pressure not due to an elevation change, may be incorrectly assumed to be due to elevation. This will lead to an incorrect determination of altitude. For drones, this incorrect determination may be manifest as an inability to maintain stable elevation. The techniques of this disclosure may be employed in these and other applications. Correspondingly, corrections to pressure sensor data may be used when determining motion of mobile device 102, particularly in a vertical direction or when determining height or elevation. As such, determining vertical motion, as used herein, means establishing a position for mobile device 102 including height or elevation, and/or characterizing a change in height or elevation, including determining that substantially no change has occurred in elevation. Correcting the pressure sensor data may comprise any type of correction or calibration to make sure that the corrected pressure data can be reliably used to determine (vertical) motion.

Figure 6:
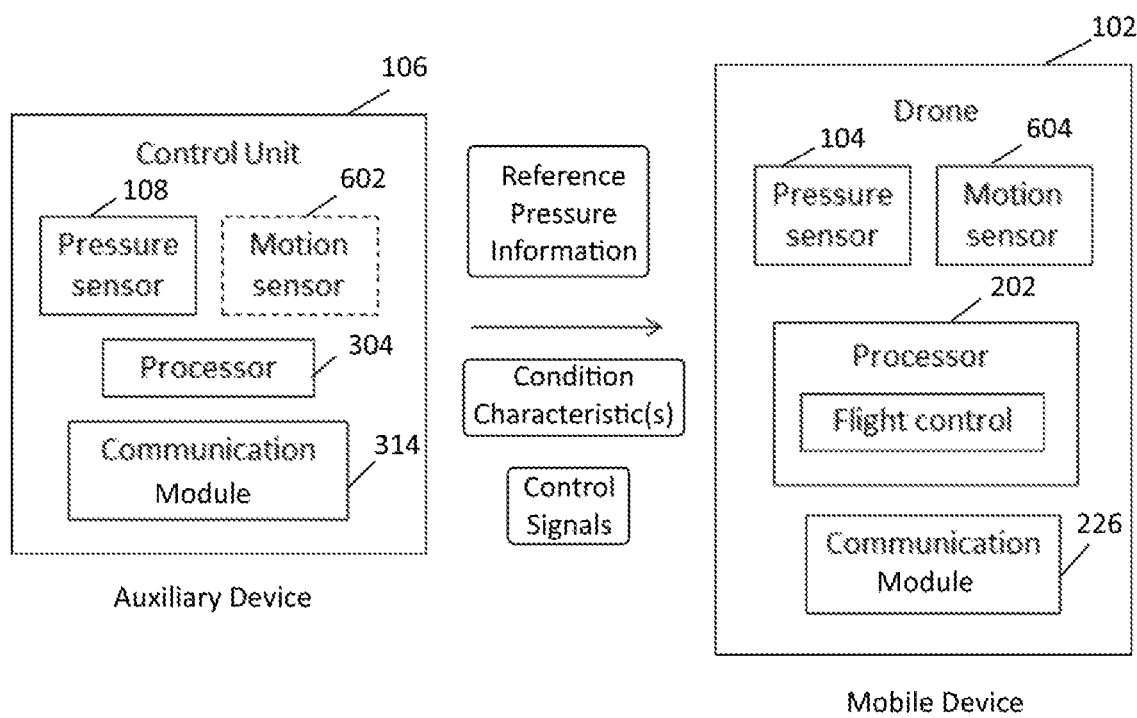
FIG. 6 is schematic diagram of a pressure sensor correction system having two devices according to an embodiment.

As discussed above, mobile devices may have additional devices associated with them. For example, a drone may have a control unit as an auxiliary device or associated additional device. This control unit is employed by the user to send commands that govern the motion of the drone. The control unit may be a dedicated/associated additional device or may be e.g. a smartphone phone with an application to control the drone. FIG. 6 shows a schematic representation of an embodiment in which mobile device 102 is implemented as a drone and auxiliary device 106 is implemented as an associated control unit, depicting the flow of information between the devices. In this context, auxiliary device 106 may be used to send control signals to mobile device 102 as shown. The devices may include functional components as described above regarding FIGS. 2 and 3. For example, motion sensor 602 of auxiliary device 106, if provided, may be any combination of inertial sensor 310, external sensor 312 or other suitable sensor architectures, while motion sensor 604 of mobile device 102 may likewise be any combination of inertial sensor 212, external sensor 214 and/or auxiliary sensor 216. To pilot the drone, processor 202 may implement a suitable flight control module. In this example, the drone (mobile device 102) has pressure sensor 104, and the control unit (auxiliary device 106) is equipped with pressure sensor 108, the pressure data from the control unit may be used as reference pressure information to correct, if needed, the pressure data from the drone. Thus, FIG. 6 indicates that auxiliary device 106 may communicate reference pressure information to mobile device 102, as well as any determined condition characteristics. Further, the flow of information, including reference pressure information and condition characteristics, is depicted as being transmitted from auxiliary device 106 to mobile device 102 corresponding to correction module 224 being implemented in mobile device 102. However, as noted above, other architectures may be employed that implement the functionality of correction module 224 in auxiliary device 106 or divide the functionality among multiple devices. As such, different flows of information may be appropriate, for example, mobile device 102 may transmit measurements from pressure sensor 104 to auxiliary device 106, optionally along with one or more determined condition characteristics, so that correction calculations may be performed at auxiliary device 106 and the appropriate corrections or adjustments returned to mobile device 102. In general, one or more context or condition characteristics may either be sent from auxiliary device 106 to mobile device 102, from mobile device 102 to auxiliary device 106, or both.

In this example, the pressure sensor in the drone may be corrected using the pressure sensor in the control unit. One of ordinary skill in the art will appreciate that correction may refer to any adjustment or calibration of measurements recorded by pressure sensor 104 being made to compensate for changes in pressure other than caused by elevation changes. In other words, the sensor readings, such as data from pressure sensor 108 of auxiliary device 106, may be used as reference pressure information for mobile device 102. If the pressure as measured by the control unit (auxiliary device 106) has changed due to external influences, and it may be assumed that the drone has been exposed to the same external influences, then the pressure change as measured by the control unit due to external influences may be used to correct the pressure change of the drone (mobile device 102) such that any remaining pressure change determined by pressure sensor 104 is only due to elevation changes of the drone. In one embodiment, the correction of the pressure sensor data from the mobile device may comprise subtracting the reference pressure from the pressure sensor data of the mobile device. The subtracting may be weighted, meaning that a weight, or multiplication factor, is applied to the reference pressure before performing the subtracting. In this case, it may be assumed that the elevation change of the control unit may be neglected (compared to the elevation change of the drone), although dedicated sensor integrated with auxiliary device 106 may be able to detect whether sufficient change has occurred, and to adjust the compensation for correction of pressure sensor 104 accordingly. One or more condition characteristics may be used as tests or otherwise to determine, if, and to what extent, the reference pressure information from auxiliary device 106 may be applied to correct or otherwise calibrate the pressure measurement at mobile device 102. The condition characteristics may be used to determine the weight of the reference pressure in the correction. Based on these characteristics, a confidence factor may be determined evaluating the reliability for a given application of the pressure measure by auxiliary device 106 when correcting mobile device 102. The confidence factor may be compared to a threshold, and if the confidence if greater than the threshold the correction may be performed.

As discussed above, a condition characteristic may be considered anything having a known or estimated impact on the pressure being measured, such as by pressure sensor 104 and/or pressure sensor 108. A condition characteristic may refer to the environment, the usage, or context of the mobile device or additional/auxiliary device. Another suitable class of such characteristics is one that relates to conditions affecting auxiliary device 106 rather than mobile device 102. In one aspect, a motion criteria or motion test may be applied to the auxiliary device as warranted by a condition characteristic. For example, in the context of the drone and controller context, motion (particularly in the vertical direction) of the control unit may be monitored, such as by using motion sensors 602, to influence how the reference pressure information provide by auxiliary device 106 is used when correcting pressure sensor 104 of mobile device 102. To illustrate, a motion threshold may be set, and if the motion of the control unit is above this threshold, the pressure data from the control unit is not used. Alternatively, if the motion is above the threshold and vertical displacement may be estimated, the reference pressure information may be adjusted by an appropriate amount in relation to the estimated vertical displacement of auxiliary device 106. This motion threshold may be e.g. a speed threshold or a displacement threshold, and these thresholds may be absolute thresholds, or may be relative thresholds compared to the motion of mobile device 102, or any other characteristic used to evaluate the current correction state of pressure sensor 104. In another example, the influence of the reference pressure information may be weighted or otherwise adjusted based on the determined motion of auxiliary device 106. For example, the weight of the reference pressure information may be decreased in relation to the amount of determined (relative) motion of the control unit.

It may also be determined to what extent the mobile device and the auxiliary device are exposed to the same external influences. In one aspect a proximity criteria or proximity test may be applied to auxiliary device 106 and mobile device 102 as another class of condition characteristic. For example, in the context of the above embodiment, if the drone is very far away from the controller, the drone may not experience the same external influences as the control device. In a similar fashion as with the motion criteria, a proximity threshold may be used, or the reference pressure weight may be adapted based on the result of the proximity test. The proximity, or distance between the auxiliary device and the mobile device may be determined using various techniques and sensor, such as for example, motion or location sensors, proximity sensors, or based on radio communication methods (e.g. time of flight, or signal strength). Image or audio sensors, implemented by external sensors 214 and/or 312 for example, may also be used to determine the proximity. As an illustration, if mobile device 102 is a drone, auxiliary device 106 may have a microphone and, by filtering and tuning the audio to the rotor frequencies, proximity may be estimated in relation to the amplitude of the audio signal determined to correspond to the drone's rotors.

In the examples above, the influence of various condition characteristics has been addressed in isolation. However, it will be appreciated that the information represented by the condition characteristics may be combined when adapting the correction of pressure sensor 104. As one illustration, the above discussion regarding proximity may have more relevance in an outdoor location as compared to an indoor location. Thus, by determining a location condition characteristic that indicates an outdoor environment rather than an indoor environment, more emphasis may be placed on the influence or effect of the proximity condition characteristic as compared to situations in which an indoor environment condition characteristic has been determined. Since indoor environments are typically more controlled, a different exposure to external influences may be less likely. Therefore, correction of pressure sensor 104 may be adaptive to the type of environment such as e.g. indoor or outdoor, either alone or in combination with adjustments related to other condition characteristics. Further, any aspect of the correction may be set by the user, or may be preset depending on the intended use of the device. Correspondingly, the type of correction performed by be automatically adapted to the detected environmental condition characteristic. One or more of the condition characteristics may be based on the associated sensors of auxiliary device 106 and/or mobile device 102, including without limitation image sensors, audio sensors, location sensor, and the like.

Figure 7:
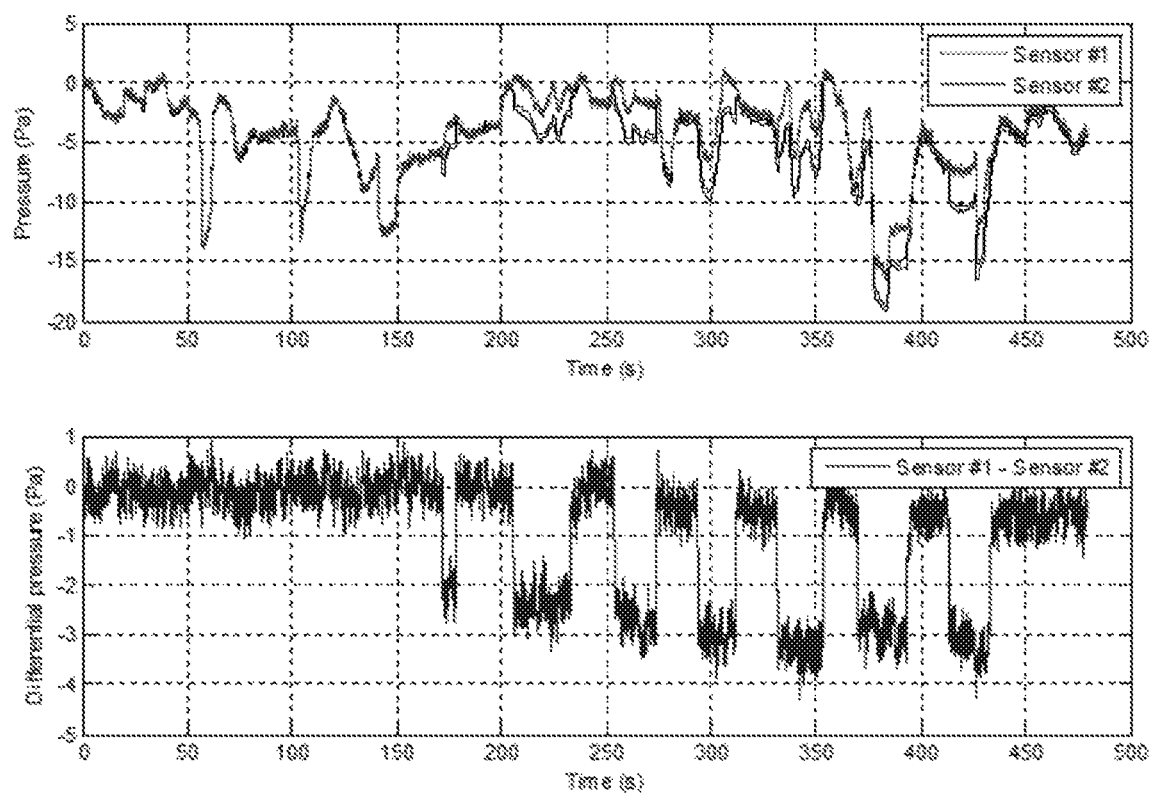
FIG. 7 is schematic representation of corrected indoor pressure sensor according to an embodiment.
Figure 8:
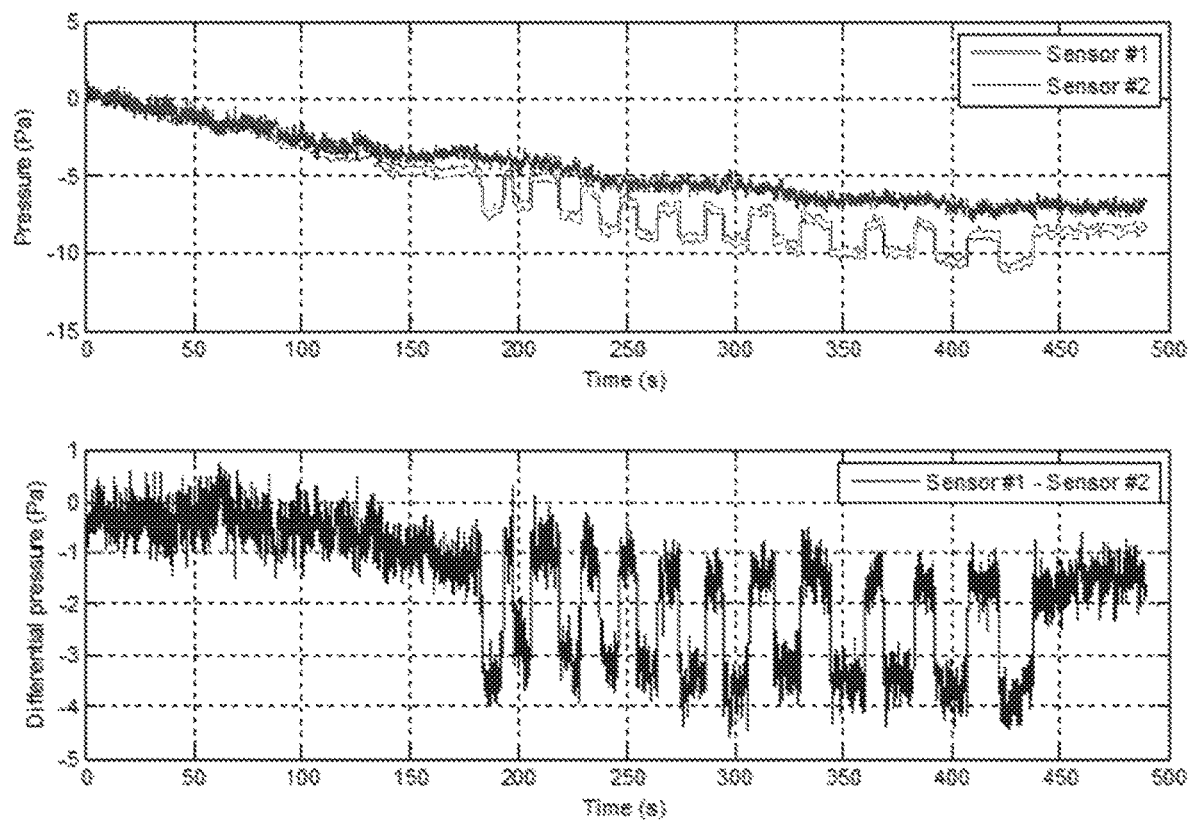
FIG. 8 is schematic diagram of a corrected outdoor pressure sensor according to an embodiment.

To help illustrate the impact of a condition characteristic on the manner in which correction of pressure sensor 104 is performed, FIGS. 7 and 8 show example measurements of pressure changes for an indoor environment and an outdoor environment, respectively. The top panes of each figure show the pressure of the drone (sensor 1), representative of mobile device 102 and pressure sensor 104, and the control unit (sensor 2), representative of auxiliary device 106 and pressure sensor 108. As discussed above, pressure measurement for the drone graph and sensor 1 should represent pressure changes due to height changes, subject to any condition characteristic that may influence such measurements. The variation in the pressure in the top pane of FIG. 7 reflects pressure change due to air conditioning system switching on and off, and the closing and opening of doors. Correspondingly, the bottom panes show the corrected pressure, where reference pressure information from the control unit (sensor 2) is used to correct the pressure data from the drone (sensor 1). This corrected pressure at mobile device 102, as corrected for external influences by the differential pressure sensing performed at auxiliary device 106, may then be used to determine the altitude of the drone.

Figure 9:
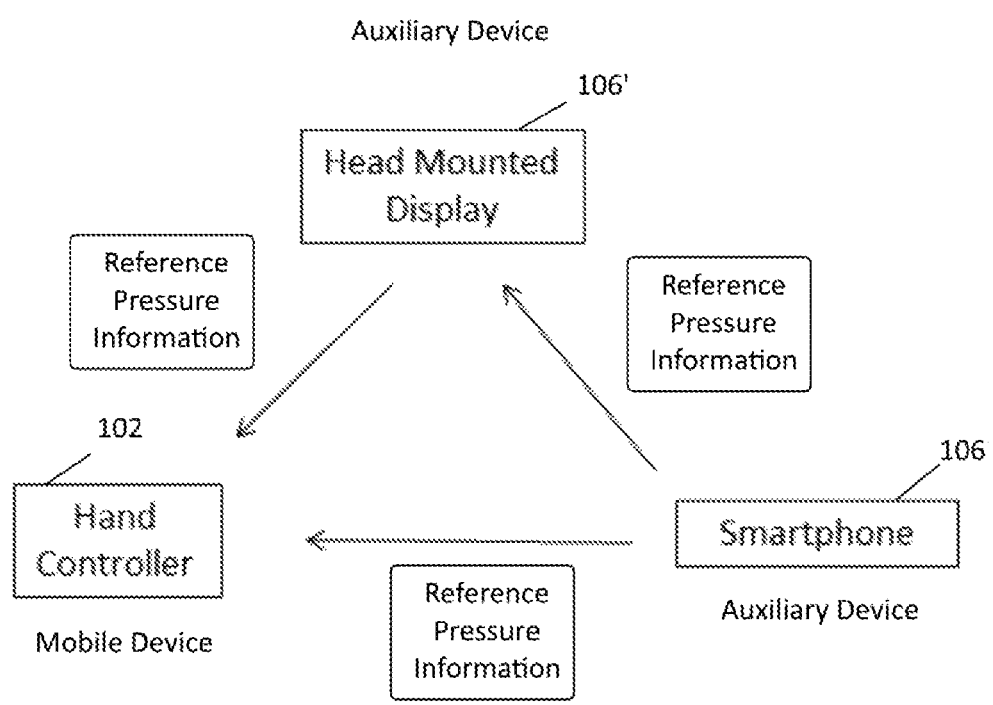
FIG. 9 is a schematic diagram of a pressure sensor correction system having three devices according to an embodiment.

The embodiments above have described the techniques of this disclosure primarily in the context of two devices, mobile device 102 and auxiliary device 106. However, it will be appreciated that similar techniques may be employed with multiple auxiliary devices. To help illustrate, one embodiment involves a VR system with a HMD, a Hand Controller (HC) and a smartphone as schematically depicted in FIG. 9. As indicated, the HC may be mobile device 102, while the HMD and the smartphone may alternatively be auxiliary device 106 and auxiliary device 106'. The user of the VR system wears the HMD on his or her head, and holds the HC in his or her hand. The HC may be used to control the game or other VR application and may be used in addition to represent an object in the virtual world. Further, the user may be in the possession of a smartphone, where in possession means that the user is carrying the smartphone on the user, or has placed the smartphone in the vicinity of the user, such that the smartphone is associated with the system and may be a source of reference pressure information. However, such an auxiliary device need not be otherwise involved in other operations of the VR system.

With regard to this embodiment, either or both of auxiliary device 106 and auxiliary device 106' may be used for reference pressure information. Moreover, one of the auxiliary device may provide reference pressure information for the other auxiliary device. In the context of the above illustration, if auxiliary device 106' provides a source of reference pressure information and is otherwise not employed by the VR application, it may be considered to be relatively stationary and any measured pressure changes may indicate a global condition affecting all of the devices. This assumption may be validated or confirmed by any suitable technique, including using any motion sensor data available for auxiliary device 106'. For example, condition characteristics determined for each device may be compared. When sufficient confidence exists that changes in atmospheric pressure for one device also affect one or more other devices, reference pressure information for one auxiliary device 106 may be used to help correct either or both of another auxiliary device 106' and mobile device 102.

Alternatively or in addition, reference pressure information from multiple auxiliary devices, such as auxiliary device 106 and auxiliary device 106' may be combined, subject to any warranted weighting, and used when correcting mobile device 102. Similar condition characteristic(s) may be applied as desired. In this context, one or more condition characteristics may be used in a condition test to be performed for any auxiliary device contributing to the reference pressure information. For example, if the condition of the smartphone is such that it is immobile, or close to immobile, the pressure sensor of the smartphone may be used to provide a reference pressure for the HMD and/or HC. The inertial sensors in the smartphone may detect the absence of motion, e.g. because the device is lying on a table, and may provide the pressure sensor readings as a reference. This reference pressure may then be transmitted to the HMD and the HC for correction of pressure changes not due to height changes. If the processing of the HC data is done by the HMD, the smartphone may not need to send the pressure data to the HC since the pressure data sent to the HMD may also be used as a reference for the HC. As in the example above, condition characteristics affecting each of the devices may be compared to determine if the smartphone is likely to be exposed to the same external influences as the HMD and/or HC. Tests involving these condition characteristics may be performed using position/location information, or wireless signal exchange of strengths, in order to determine a distance between the devices.

As will be appreciated, the above example involves an application in which the HC may experience more changes in altitude than the smartphone or HMD. However, in other usage contexts, another component may be expected to be subject to more significant changes in elevation. In such applications, the device undergoing more changes in altitude may be considered mobile device 102, while any other associated auxiliary devices 106/106' may be used as potential sources of reference pressure information, as well as being used to determine one or more condition characteristics. Moreover, the role associated with auxiliary device 106, i.e., providing reference pressure information, may be dynamically reassigned among the devices in the system depending on which is currently more stable or less influenced by external factors.

In this example, the HMD may be considered as acting in the role of mobile device 102 when correcting its pressure sensor using reference pressure information from the smartphone as indicated in FIG. 9. Further, the HMD may also act in the role of auxiliary device 106' by providing reference pressure information to the HC. In this example system, the HC in the hand is more likely to be moved more than the HMD on the head, and thus the HC may be expected to undergo more elevation changes. The HMD may be moved a lot, but in typically this involves orientation changes or lateral motion, and not up and down motion that leads to height changes. Therefore, pressure data from the HMD may also be used as a reference pressure information for the HC. The inertial sensors of the HMD may be used to determine if the user is not moving the head too much (in a vertical direction) as one suitable condition characteristic. A motion threshold may be used to determine if the pressure data from the HMD may be used. This motion may be in a certain direction or along a certain vector, or may be limited in dimensions, for example, only considering the vertical direction. As mentioned in the example of the drone, the motion may also be used to give a weight or other influence to the pressure data of the HMD when correcting the pressure in the HC.

Figure 10:
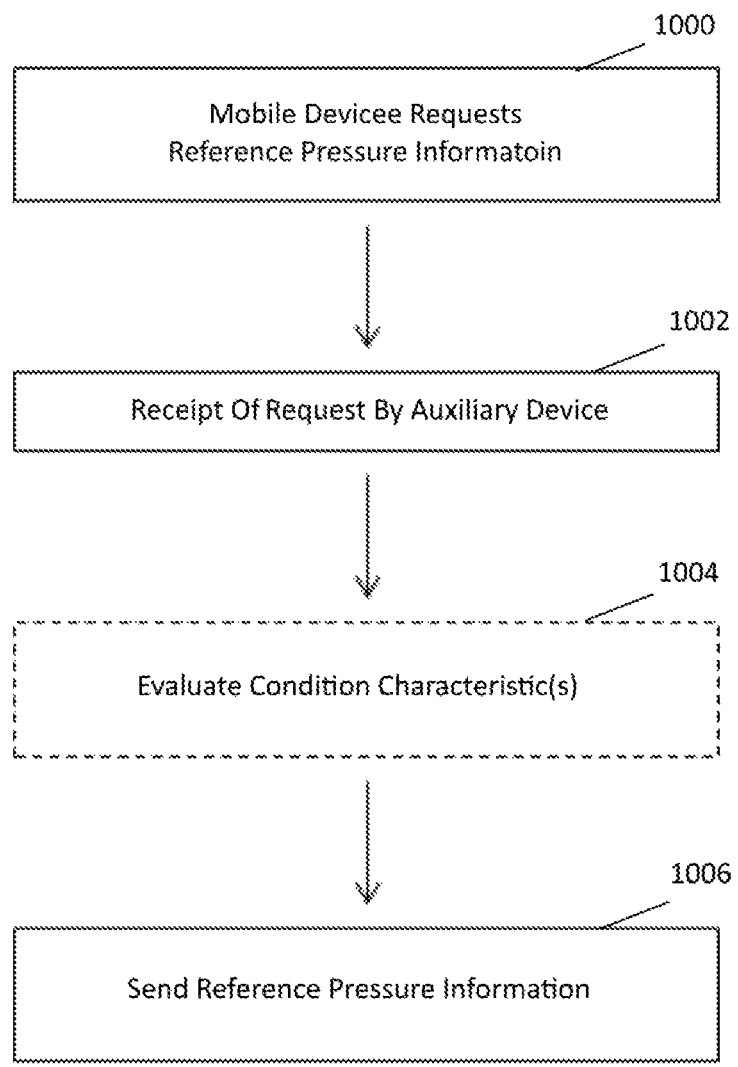
FIG. 10 is flowchart showing a routine for correcting a pressure sensor for mobile device using reference pressure information from an auxiliary device according to an embodiment.

To help illustrate aspects of this disclosure, FIG. 10 schematically depicts a sequence of operations that may be performed when performing differential pressure sensing to calibrate or correct the pressure sensor of one or more devices. Mobile device 102 may determine that reference pressure information may provide a more accurate altitude determination, such as by evaluating one or more condition characteristics to determine whether the reference pressure information may be used to correct the measurements of pressure sensor 104. Correspondingly, mobile device 102 may send a request for reference pressure information in 1000. This request may be a onetime occurrence, may be based on determined need or may be periodic as desired. Further, the request may be a direct communication with an auxiliary device 106, where an association has already been defined with mobile device 102. Alternatively, the request may be in the form of a wider broadcast or multicast, to any device in proximity having capability to provide pressure reference information. The request may also specify a certain required accuracy or other quality criteria. After auxiliary device 106 has received the request in 1002, one or more condition characteristics may be evaluated in 1004. As indicated, this is optional and may involve condition characteristics affecting either or both of mobile device 102 and auxiliary device 106. In 1006, auxiliary device 106 may then send the requested reference pressure information directly to mobile device 102. In other embodiments, the decision of whether and when to transmit reference pressure information may be determined by auxiliary device 106. As such, auxiliary device 106 may periodically transmit reference pressure information, optionally along with any determined condition characteristics. Alternatively, auxiliary device 106 may transmit reference pressure information after evaluating one or more determined condition characteristics to establish a desired validity of the reference pressure information.

As discussed above, a condition characteristic may be evaluated as a test to determine the suitability of available reference pressure information at a given time. Thus, the decision of whether to send the reference pressure information in 1006 may be predicated on the outcome of the test. Any suitable condition characteristic or combination of characteristics may be used in the evaluation, including the usage, environmental, proximity, motion and other characteristics discussed above. In this embodiment, the transmission of reference pressure information may be based on the evaluation. However, in other embodiments, the reference pressure information may be sent regardless, along with any determined condition characteristics, and the evaluation may be performed by mobile device 102 to determine whether to apply a correction involving the reference pressure information. As discussed, the decision of whether to apply a correction may include weighting the reference pressure information, such as by adjusting for confidence in the accuracy of the information. Still further, auxiliary device 106 may either send a determined condition characteristic to mobile device 102, or may send sensor or other information to mobile device 102 for determination of the condition characteristic. For example, when receiving the request, auxiliary device 106 may send reference pressure information and motion sensor data, so that mobile device 102 may determine a motion condition characteristic for auxiliary device 106 when deciding whether to correct or what the weight to give the reference pressure information. Again, mobile device 102 may receive reference pressure information from a plurality of auxiliary devices, and may then select which reference pressure information to employ based on any determined condition characteristics. Likewise, reference pressure information from multiple sources may also be combined, with relative weighting as appropriate for any determined condition characteristics. One or more additional device may be selected from among a plurality of mobile device to supply a reference pressure, and the selection may be based on the condition characteristic. For example, the condition characteristic may be a motion characteristic, and the selecting may comprise comparing the motion characteristics and selecting one or more mobile devices with a certain motion characteristic, e.g. motion below a certain motion threshold.

As mentioned above, pressure sensor data and the inertial or other motion sensor data may be used to determine the altitude of mobile device 102. Both types of sensors have problems or problem conditions that may influence the accuracy of the height calculations. For the pressure sensor, there are the influences of external factors as explained above, and to correct for this, reference pressure information may be used so that height estimation is based on differential pressure measurements. Height (or height change) estimated from sensors other than a pressure sensor may also have problems due to drift and/or offsets of the sensors. For example, when accelerometers are used, any offset or drift may lead to an error in the determined altitude, due to the fact that a double integration is required for positional determinations.

To help mitigate problems or inaccuracies associated with individual sensors, a sensor fusion combining the differential pressure measurements and the motion data may be used. The principle of the fusion is to combine the pressure and motion data in such a manner that the best combination is selected, and may be based on any determined condition characteristics following the techniques described above. In other words, the contribution or weight of the pressure and motion data may be varied and adapted. As a further illustration, when using accelerometers to determine the acceleration of mobile device 102, the acceleration due to gravity has to be removed from the accelerometer readings. The estimation of the gravity vector and the conversion between reference frames may also lead to uncertainties or errors, which, when doubly integrated, may lead to an error in the determined altitude. Thus, in a situation where there is a long period of motion, the weight of the motion data may be reduced because any potential accelerometer offset may lead to errors due to the extended integration period. Similarly, when the motion is to quick, leading to large acceleration, the weight of the motion data may also be reduced. This also means that in the opposite conditions with short periods of motion and/or low motion speeds/amplitudes, the accelerometer data may have an increased weight in the altitude determination In a similar manner, the weight attributed to the differential pressure measurements may also be adjusted. For example, if auxiliary device 106 is subject to condition characteristics indicating there are many and/or large pressure changes due to external influences, the weight of the differential pressure measurements may be reduced. Even though the reference pressure information is used, errors in the calculation may still occur. Likewise, if the system determines as a proximity condition characteristic that there is a larger distance between mobile device 102 and auxiliary device 106 such that both devices may experience different external influences, the weight of the differential pressure measurements may also be reduced.

The fusion of the pressure data and the motion data may be referred to as 7-axis fusion, where the motion data represents 6-axes or degrees of freedom, and the pressure sensor provides the $7^{th}$ axis or degree. The 6-axis may refer to the use of a 3-axes accelerometer and a 3-axes gyroscope, and the fusion of the accelerometer and gyroscope is often referred to as 6-axes fusion. In another embodiment, a 10-axis fusion may involve accelerometer, gyroscope, magnetometer and pressure sensor data. The fusion may be performed using any suitable technique. For example, altitude may be determined individually for the motion data and the differential pressure measurements, and then both values may be combined, where the weights of each contribution are varied depending on the conditions as described above.

Figure 11:
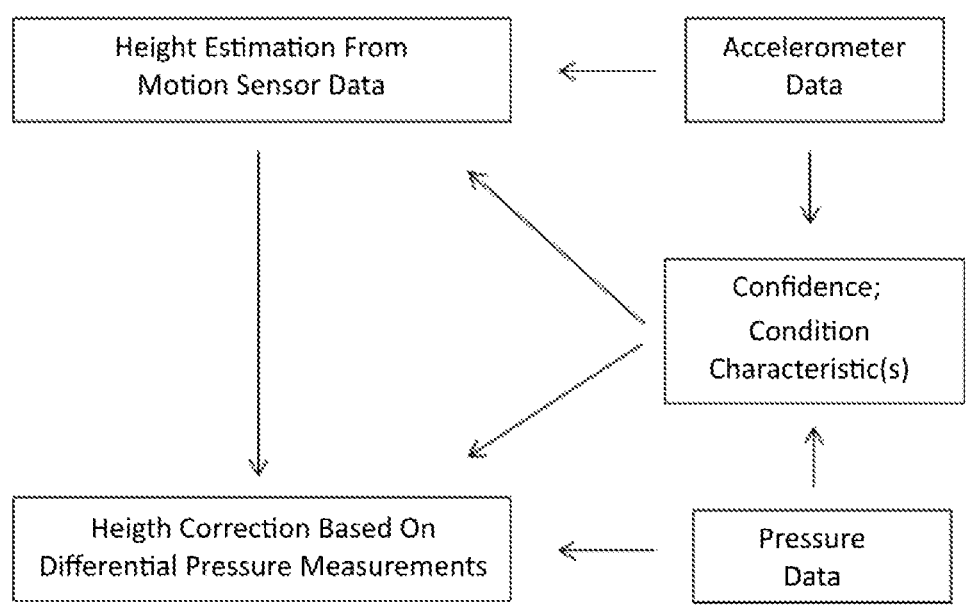
FIG. 11 is schematic diagram of a Kalman filter for fusing pressure sensor data according to an embodiment

Alternatively, a form of a Kalman filter may be used to perform the fusion, where the weights of the motion and pressure data in the prediction and the correction are adapted. One example of a suitable Kalman filter system is schematically shown in FIG. 11. As depicted, altitude prediction for mobile device 102 may be based on motion sensor data, such as the determined linear acceleration, and may be influenced by confidence in the determination. If this confidence is high, the covariance of the prediction may only be increased slightly, while if this confidence is low, the covariance of the prediction may increase more significantly. The correction of the altitude estimation may then be performed as discussed above, using differential pressure measurement to correct pressure sensor 104 of mobile device 102. Because the accelerometer data may be obtained at a relatively high sample rate (e.g. 1 kHz), as compared to the sample rate of pressure data (e.g. 40 Hz), the prediction will run at a faster rate than the correction. The correction based on the pressure data may be adapted based on the confidence in the pressure data or based on the condition characteristics associated with the pressure data. If the pressure does not change much and/or a correct reference pressure is used in a differential pressure system, then the gain of the applied correction may be large. If large and/or fast pressure variations are observed, and/or a reference pressure with some uncertainty is used, the gain of the applied correction may be smaller. In other words, the prediction and the correction may be adapted based on confidence in the motion sensor data as well as any determined condition characteristic.

The combination of the motion data and the pressure data may also be used to learn about the correct application of the reference pressure information, and under which condition characteristics it may be applied. For example, when there is high confidence in the motion data, but the altitude or elevation as determined using the pressure data is different from the altitude determined based on the motion data, this may indicate that the reference pressure may not have been correctly determined. Correspondingly, correction may not be applied, or may be applied with a different weight. Thus, based on this comparison, the system may learn the conditions and approximate weights of the application of the reference pressure depending on determined condition characteristics.

In embodiments where the reference pressure information is used to correct or correct pressure sensor 104 of mobile device 102, factors may also influence the pressure sensor data of the mobile device. For example, usage condition characteristics were discussed above. In applications for drones or similar devices, rotor speed may create local pressure effects which may be corrected for in order to correctly determine the altitude of mobile device 102. Therefore, a correction for the local pressure effect may be performed in addition to any correction based on differential pressure measurement. The local pressure effect due to the rotors may be investigated and calibrated during the design phase of the drone. The placement of the pressure sensors may also be adapted to minimize the local pressure effects and decrease pressure noise, for example, by selecting to mount the pressure sensor on top or below the drone body. Further, a correlation between rotor speed and the pressure measured by pressure sensor 104 may be established and used to more accurately estimate height. When these investigations are done in the design phase, the results may be stored in a memory on the device, for example as lookup tables, and the correction for the local pressure effect may be performed depending on the associated condition characteristics. The local pressure effect due to the rotors may also be influenced by the elevation of the drone or the proximity to the ground. When the drone is close to the ground, the presence of the ground creates a ground effect, which may be estimated as an addition to the rotor effect or a modification to the rotor effect as desired. This ground effect decreases as the drone gains elevation and is farther from the ground, and the compensation may be adapted accordingly. Condition characteristics related to the ground effect or the rotor effect may also be determined using the motion sensor, and optionally, may be influenced by confidence in the motion data. For example, when the drone is stable on the ground and then takes off, increasing its elevation, the motion data may be considered more accurate given that the motion sensors may be calibrated when the drone is stable on the ground. As the drone increases elevation, the height may be determined based on the motion data, and then compared to the height estimated from the corrected pressure data. When the height increases, it may be expected that the ground effect decreases, while the rotor effect may stay approximately constant. As such, the total effect of the combined ground effect and the rotor effect, will approach the rotor effect only as the height increases. Therefore, by using the motion data, the influence of the ground effect and the rotor effect on the pressure measurements may be characterized, and a correction for these local pressure effects may be determined.

The application of the differential pressure measurements and the fusion of the pressure data and motion data (often referred to as 7-axis fusion) requires an integration of all the sensor processing. This integration may be an integral part of the system design from the start. However, in some situations mobile device 102 may be designed to simply use direct pressure measurement as an input. In this case, a self-correcting pressure sensor may be used that provides the system with a pressure measurement, but where the provided pressure data has been corrected to take all the above described effects into account. This self-correcting pressure sensor may either have integrated motion sensors, or may have an input to obtain external motion data. Thus, the output of a self-correcting pressure sensor is in the same format as normal pressure data from a conventional pressure sensor, but in fact represents corrected and adjusted pressure data that may reliably be used to determine altitude. Effectively, this implements at least some of the functionality associated with correction module 224 in SPU 206, offloading this responsibility from host processor 202 and removing the need to modify any existing flight control module.

Figure 12:
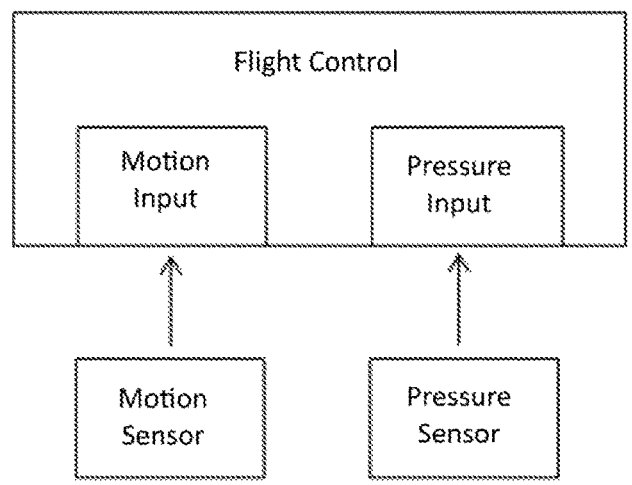
FIG. 12 is a schematic representation of an architecture for providing flight control using motion and pressure inputs.
Figure 13:
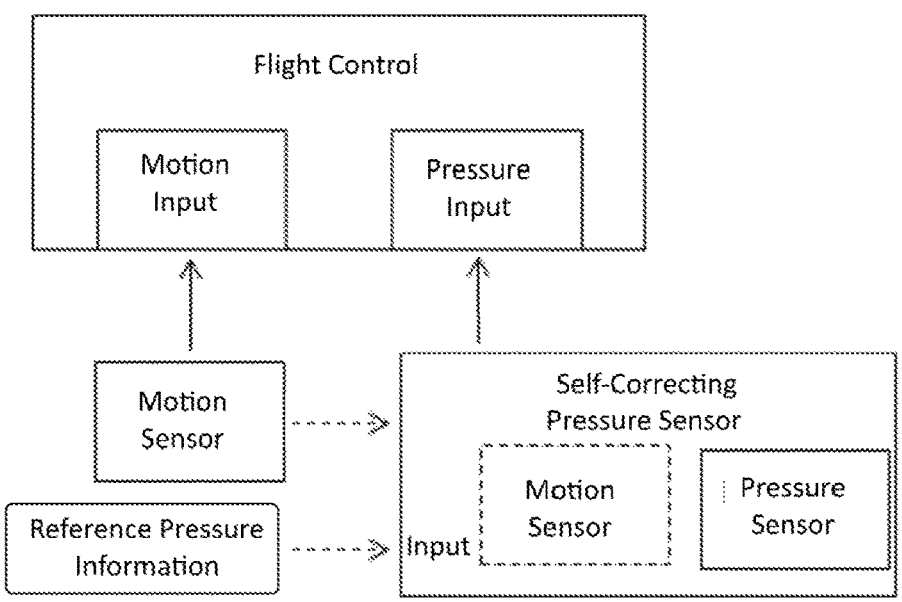

Correspondingly, FIG. 12 schematically depicts an example of an architecture where the flight control of a drone is designed to receive motion input from a motion sensor and a pressure input to receive pressure data from a pressure sensor. Although the flight control may determine the altitude of the drone based on the pressure sensor, it may not be designed to use reference pressure information according to the techniques of this disclosure. Use of reference pressure information in this architecture may require the flight control module to be modified, which is not always possible or desired. Therefore, FIG. 13 schematically depicts an architecture employing a self-correcting pressure sensor, in which the pressure data is corrected or adjusted external to the flight control. As shown, the self-correcting pressure sensor may receive motion sensor data from external sensors or may have dedicated motion sensors that are integrated. The output of the self-correcting pressure sensor may be directly fed to the fight control module. Thus, the self-correcting pressure sensor may perform the motion and pressure data fusion using internal or external motion sensors and this processing may be done by a processor integrated with the self-correcting pressure sensor, similar to SPU 206. As indicated by the comparison of FIGS. 12 and 13, no modification of the flight control module is needed to employ a self-correcting pressure sensor.

Figure 14:
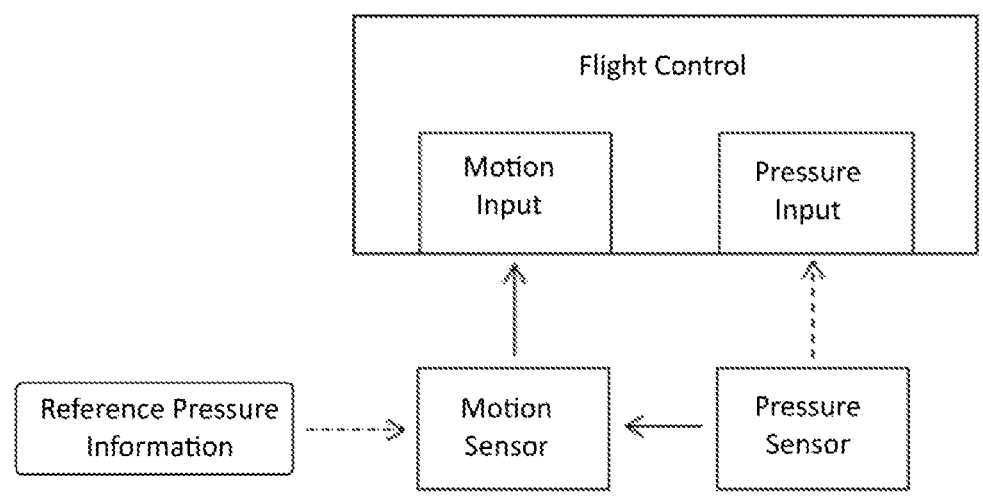
FIG. 14 is a schematic representation of supplying corrected motion sensor data using sensor fusion according to an embodiment.

In some architectures, the fusion of the motion data and the differential pressure measurements may be used to provide corrected motion data rather than corrected pressure data. One exemplary embodiment is schematically depicted in FIG. 14. As shown, the motion sensor may receive both reference pressure information as well as the measurements from an on-board pressure sensor. Following the techniques discussed above, the differential pressure measurements may be used to correct the motion data for any uncertainties or errors due to e.g. drifts or offsets or the accelerometer or gyroscope. As a result, the altitude of the device may be reliably determined based on the motion data as corrected using the reference pressure information. Optionally, the pressure data may no longer be used in order not to affect the corrected motion data negatively. Alternatively, the flight control may not have a pressure sensor input, but may rely only on the corrected output of the motion sensor. The architectures represented by FIGS. 13 and 14 may also be combined in order to provided correction pressure data and corrected motion data, such that the best possible data is provided to the flight control (independent of how the flight control processes the data).

Although these examples focus on the application of a drone and its flight control unit, the same architecture may also be applied to other mobile devices, such as e.g. a HMD system described above, or devices used for activity detection (smartphone, wearables, etc.). In these cases, the flight control module would be substituted with a corresponding module that benefits from more accurate altitude determination.

The motion of the mobile device is not necessarily in all 3D dimensions. In some embodiments, the motion of the mobile device may be limited to two or one dimension, as long as least motion in the vertical direction is allowed since this motion leads to a change in pressure. In one embodiments, the differential pressure sensing techniques discussed here may be applied in security systems. For example, a pressure sensor on a window may be used to detect if the windows is moving or not (in a vertical direction). Applications already exist where motion sensors are used to detect movement of the windows, but by slowly moving the window the detection of the movement may not be detected. Similarly, by only using a single pressure sensor on the moving window, slow movement may not be detected because it may be interpreted as a change in background pressure. By using a differential pressure sensor technique, the system become more secure and fool-proof. In one embodiment, a plurality of windows may be equipped with a pressure sensor, and their pressure data may be compared. Since it is highly unlikely that all windows are moved at the same time, by measuring the differential pressure between the different pressure sensors of the system, movement of a window may be detected. For example, comparing the data from each pressure sensor with the average pressure from the plurality of sensors. The deviation of each sensor with respect to the average may be compared to a threshold to determine if a window has been moved. Opening a window may also affect all the pressure sensors (if mounted on the inside) due to a difference in pressure between the indoors and the outdoors before the windows was opened. However, this change may be similar for the different sensors. In another embodiment, a first pressure sensor may be mounted on the moving part of the windows, and a second pressure sensor may be mounted on the stationary part of the window, and act as the reference pressure sensor. Any of the pressure sensors in these examples may be combined with motion sensors, such as e.g. accelerometers.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated. Some embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

From the above materials, it will be appreciated that this disclosure includes methods for correcting the pressure sensor of a mobile device. In one aspect, the reference pressure information used for correction may be based at least in part on a pressure sensor integrated with the first auxiliary device.

In one aspect, the reference pressure information may correlate with ambient pressure.

In one aspect, correcting the pressure sensor may be based at least in part on a determined condition characteristic. The determined condition characteristic may be an estimated distance between the first auxiliary device and the first mobile device, wherein correcting the pressure sensor further includes compensating for the estimated distance.

In one aspect, the determined condition characteristic may be a usage condition characteristic.

In one aspect, the determined condition characteristic may be an environmental condition characteristic. The pressure sensor may be corrected using the measured pressure and the reference pressure information when the environmental condition characteristic corresponds to an indoor location and not correcting the pressure sensor when the environmental condition characteristic corresponds to an outdoor location.

In one aspect, sensor data from at least one of the first mobile device and the first auxiliary device may be used to determine the condition characteristic. The sensor data may be motion sensor data. The determined condition characteristic may be stability of the first auxiliary device. The first mobile device may be experiencing changes in altitude, so that altitude of the first mobile device may be determined using the corrected pressure sensor.

In one aspect, data from the corrected pressure sensor may be fused with motion sensor data for the first mobile device. Fusing data from the corrected pressure sensor with other motion sensor data may be based at least in part on a determined condition characteristic. Fusing data from the corrected pressure sensor with other motion sensor data may be based at least in part on an evaluation of the reference pressure information.

In one aspect, reference pressure information may be received from a second auxiliary device, wherein the reference pressure information used for correcting the pressure sensor may be derived by evaluating the reference pressure information from the first auxiliary device and the reference pressure information from the second auxiliary device. A condition characteristic may be determined, so that evaluating the reference pressure information from the first auxiliary device and the reference pressure information from the second auxiliary device may be based at least in part on the determined condition characteristic. Evaluating the reference pressure information comprises may include selecting one of the reference pressure information from the first auxiliary device and the reference pressure information from the second auxiliary device. Evaluating the reference pressure information may include combining reference pressure information from the first auxiliary device and the reference pressure information from the second auxiliary device with relative weighting.

In one aspect, reference pressure information may be provided to a second mobile device, wherein the reference pressure information provided to the second mobile device may be based at least in part on the corrected pressure sensor of the first mobile device.

In one aspect, a method for determining motion of a mobile device may include obtaining sensor data from the mobile device comprising at least pressure sensor data, obtaining sensor data from at least one additional device comprising at least pressure sensor data, wherein the pressure sensor data from the at least one additional device is used as reference pressure information and correcting pressure sensor data from the mobile device based at least in part on the reference pressure information, wherein a vertical motion of the mobile device is determined based at least in part on the corrected pressure sensor data.

In one aspect, a condition characteristic may be determined, such that the determination of vertical motion of the mobile device may further based on the determined condition characteristic. The condition characteristic may relate to the at least one additional device. Correcting the pressure sensor data from the mobile device may comprise weighting the reference pressure information based at least in part on the condition characteristic. The condition characteristic may be an estimated distance between the mobile device and the at least one additional device, wherein correcting pressure sensor data includes compensating for the estimated distance. Alternatively or in addition, the condition characteristic may be a motion characteristic.

In one aspect, the determined condition characteristic may be a usage condition characteristic.

In one aspect, the determined condition characteristic may be an environmental condition characteristic.

In one aspect, at least one of the mobile device and the at least one additional device may be selected from among a plurality of mobile devices. The obtained sensor data from the mobile device may include motion sensor data, the obtained sensor data from the at least one additional device may include motion sensor data, such that selecting the at least one additional device from among the plurality of mobile device may be based at least in part on the motion sensor data for the mobile device and the motion sensor data for the at least one additional device. The at least one additional device may be experiencing less motion than the mobile device.

In one aspect, the mobile device may send a request for the reference pressure information to the at least one additional device.

In one aspect, the at least one additional device may transmit the second sensor data in a periodic manner.

In one aspect, the obtained sensor data from the mobile device may include motion sensor data and the motion sensor data may be fused with the corrected pressure sensor data. Fusing the motion sensor data with the corrected pressure sensor data may be based at least in part on a condition characteristic.

This disclosure also includes a system for determining a motion of a mobile device with a mobile device having a pressure sensor, at least one additional device having a pressure sensor providing reference pressure information and a correction module. The correction module may correct pressure sensor data from the mobile device based at least in part on the reference pressure information sensor data from the second mobile device and determine a vertical motion of the mobile device based at least in part on the corrected pressure sensor data.

In one aspect, the mobile device may generate motion sensor data and the at least one additional device may generate motion sensor data, such that the correction module may select at least one of the mobile device and the at least one additional device from among a plurality of mobile devices based at least in part on the motion sensor data for the at least one additional device and the motion sensor data for the mobile device.

In one aspect, the system may have a plurality of additional devices, wherein the correction module may select reference pressure information from one of the plurality of additional devices when correcting pressure sensor data from the mobile device based at least in part on a condition characteristic. Alternatively or in addition, the correction module may combine reference pressure information from the plurality of additional devices when correcting pressure sensor data from the mobile device.

Still further, this disclosure includes a sensor unit of a mobile device that may have a pressure sensor outputting pressure sensor data, an input for obtaining reference pressure information from at least one additional device and an integrated processor. The processor may receive the pressure sensor data from the pressure sensor, receive the reference pressure information and correct the pressure sensor data.

In one aspect, the sensor unit may output motion sensor data and the integrated processor may combine the motion sensor data and the corrected pressure sensor data.

In one aspect, the integrated processor may correct the pressure sensor data based at least in part on a condition characteristic. The condition characteristic may be received with the reference pressure information.

In one aspect, the integrated processor may output the corrected pressure sensor data.

In one aspect, the integrated processor may determine a vertical motion of the sensor unit based at least in part on the motion sensor data and the corrected pressure sensor data.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for determining motion of a mobile device, the method comprising:
   obtaining sensor data from the mobile device comprising at least pressure sensor data;
   obtaining sensor data from at least one additional mobile device comprising at least pressure sensor data,
   defining the pressure sensor data from the at least one additional device as reference pressure information based at least in part on a condition characteristic, wherein the mobile device sends a request for the reference pressure information to the at least one additional device; and
   correcting pressure sensor data from the mobile device based at least in part on the reference pressure information, wherein a vertical motion of the mobile device is determined based at least in part on the corrected pressure sensor data.

2. The method of claim 1, further comprising determining the condition characteristic based at least in part on motion sensor data.

3. The method of claim 1, wherein the condition characteristic relates to the at least one additional device.

4. The method of claim 3, wherein correcting the pressure sensor data from the mobile device comprises weighting the reference pressure information based at least in part on the condition characteristic.

5. The method of claim 3, wherein the condition characteristic comprises an estimated distance between the mobile device and the at least one additional mobile device, wherein correcting the pressure sensor data comprises compensating for the estimated distance.

6. The method of claim 3, wherein the condition characteristic comprises a motion characteristic.

7. The method of claim 1, wherein the condition characteristic is a usage condition characteristic.

8. The method of claim 1, wherein the condition characteristic is an environmental condition characteristic.

9. The method of claim 1, further comprising selecting at least one of the mobile device and the a least one additional mobile device from among a plurality of mobile devices.

10. The method of claim 9, wherein the obtained sensor data from the mobile device includes motion sensor data, wherein the obtained sensor data from the at least one additional device includes motion sensor data, wherein selecting the at least one of the mobile device and the at least one additional device from among the plurality of mobile device is based at least in part on the motion sensor data for the mobile device and the motion sensor data for the at least one additional device.

11. The method of claim 10, wherein the at least one additional device is experiencing less motion than the mobile device.

12. The method of claim 1, wherein the at least one additional device transmits the pressure sensor data in a periodic manner.

13. The method of claim 1, wherein the obtained sensor data from the mobile device includes motion sensor data, further comprising fusing the motion sensor data with the corrected pressure sensor data.

14. The method of claim 13, wherein fusing the motion sensor data with the corrected pressure sensor data is based at least in part on a condition characteristic.

15. A system for determining a motion of a mobile device comprising:
   a mobile device having a pressure sensor;
   at least one additional mobile device having a pressure sensor; and
   a correction module configured to:
      define pressure sensor data from the at least one additional mobile device as reference pressure information based at least in part on a condition characteristic, wherein the mobile device sends a request for the reference pressure information to the at least one additional device and receives the reference pressure information from the at least one additional mobile device in response;
      correct pressure sensor data from the mobile device based at least in part on the reference pressure information; and
      determine a vertical motion of the mobile device based at least in part on the corrected pressure sensor data.

16. The system of claim 15, wherein the mobile device is further configured to generate motion sensor data, wherein the at least one additional mobile device is further configured to output motion sensor data, and wherein the correction module is further configured to select at least one of the mobile device and the at least one additional mobile device from among a plurality of mobile devices based at least in part on the motion sensor data for the at least one additional mobile device and the motion sensor data for the mobile device.

17. The system of claim 15, further comprising a plurality of additional devices, wherein the correction module is configured to select reference pressure information from at least one of the plurality of additional devices when correcting pressure sensor data from the mobile device based at least in part on the condition characteristic.

18. The system of claim 15, further comprising a plurality of additional devices, wherein the correction module is configured to combine reference pressure information from the plurality of additional devices when correcting pressure sensor data from the mobile device.

* * * * *